United States Patent
Clarke et al.

[11] Patent Number: 5,830,517
[45] Date of Patent: Nov. 3, 1998

[54] METHOD AND APPARATUS FOR USE IN THE MANUFACTURE OF OPTICAL CABLE SLOTTED RODS

[75] Inventors: Mary Ann Clarke, Granite Falls; Christopher K. Eoll, Hickory, both of N.C.

[73] Assignee: Siecor Corporation, Hickory, N.C.

[21] Appl. No.: 617,710

[22] Filed: Apr. 1, 1996

[51] Int. Cl.[6] .................................................. B29C 47/12

[52] U.S. Cl. .................. 425/461; 264/1.25; 264/177.16; 425/114

[58] Field of Search ...................................... 425/113, 114, 425/380, 461; 264/1.24, 1.25, 1.29, 177.1, 177.16

[56] References Cited

U.S. PATENT DOCUMENTS

| | | | |
|---|---|---|---|
| 2,766,480 | 10/1956 | Henning | 425/113 |
| 4,163,641 | 8/1979 | Hulin et al. | 425/461 |
| 4,181,486 | 1/1980 | Saito | 264/177.16 |
| 4,272,472 | 6/1981 | Hulin et al. | 425/113 |
| 4,548,567 | 10/1985 | Missout | 425/113 |
| 5,458,836 | 10/1995 | Rakestraw et al. | 425/461 |

*Primary Examiner*—Mathieu D. Vargot

[57] ABSTRACT

A method and apparatus for extruding a plastic rod having helical slots in its external surface includes the use of a die including a relieved exit end face, resulting in a more uniform drag on the plastic melt. Plastic rods so formed are used in slotted core type optical fiber telecommunication cables. The die includes internal channels which form peripheral ribs on the plastic rod. The channels may follow either a helical or a straight path.

19 Claims, 5 Drawing Sheets

METHOD AND APPARATUS FOR USE IN THE MANUFACTURE OF OPTICAL CABLE SLOTTED RODS

BACKGROUND OF THE INVENTION

This invention relates to a method and apparatus for use in the manufacture of slotted rods used in optical telecommunication cables.

It is known to manufacture an optical cable slotted rod by extruding plastic material around a central strength member formed of, for example, steel wire or fiber-reinforced plastic. One or more longitudinally extending slots are formed in the longitudinal external surface of the plastic material, and each slot contains at least one optical fiber or optical fiber ribbon. Each slot lies between adjacent longitudinally extending peripheral protrusions called ribs.

In order to ensure that the optical fibers are not subject to destructive tensile and compressive stresses when the cable is bent, each slot may be made so as to follow a helical path. Thus, at a curved part of a cable, an optical fiber experiences compression and tension, and over the length of the curve the stresses at least partially cancel out. In some cables, the direction of lay of the helices may reverse at periodic intervals. The method and apparatus according to this invention is for use in the manufacture of slotted rods in which the helical slots have a nonreversing direction of lay.

One method which has been proposed for forming the slots in the rods is to form a smooth rod and subsequently to machine grind the slots.

Another method for forming the slots, which is used in this invention, is to direct the extruded plastic material through the bore of a die having one or more radially inwardly extending finger-like protrusions, eliminating the need for subsequent grinding. The die protrusions form the rod slots, and the rod ribs are formed in channels between the die protrusions. A prior art method for imparting the helical form to the slots involves the extrusion of the plastic through a rotating die or a die having rotating or oscillating protrusions. Another method involves the extrusion of the plastic through a nonrotating die and rotating the rod or its central strength member to impart the desired helical shape.

The use of a cylindrical die having an inner surface provided with protrusions forming helical channels is disclosed in U.S. Pat. No. 4,548,567. Such a die advantageously allows the plastic material forming the ribs to begin to follow a helical path while still within the interior of the die, avoiding primary shear effects on the plastic material caused by a change from following a straight path within the die to following a helical path upon exiting the die. These shear effects may deform or collapse the ribs, as the plastic material emerging from the die has not yet cooled sufficiently to resist deformation. Such deformation or collapse may cause unacceptably high light signal attenuation in optical fibers laid singly or in the form of optical fiber ribbons into the slots partially delimited by the ribs. This prior art die has a downstream exit face having a smooth surface which lies in a plane perpendicular to the axis of revolution of the die.

A disadvantage of this prior art die is the generation of secondary shear effects associated with the velocity gradient in the extruded material emerging through the exit face of the die. This gradient arises because extruded plastic material forming a rib travels within a die channel along particular helical arcs each of whose lengths are determined by its particular radial position within the channel. These shear effects have consequences like those above described.

Although prior art dies can be used to make slotted rods in which the slots are relatively narrow or shallow, the shear effects above described have made it difficult or impossible to make slotted rods having a plurality of slots each of which are relatively wide and/or deep. Relatively wide slots are needed to house optical fiber ribbons, and slots must be relatively wide and deep to accommodate stacks of optical fiber ribbons in cables having a large number of optical fibers. To avoid employing an unduly large number of slotted rods in such cables, it would be desirable to manufacture slotted rods each of which can accommodate a greater number of optical fibers. Such would advantageously allow a reduction in the cable diameter.

SUMMARY OF THE INVENTION

It is therefore an object of the present invention to provide a die used in making an optical fiber cable slotted rod having one or more helical slots in its exterior surface, the die interior surface having channels which help compensate for the velocity gradient in the plastic material extruded through the die which forms the rod ribs.

Another object of the invention is to provide optical fiber cable slotted rods having dimensionally stable slots in the exterior surface thereof.

Another object of the invention is to provide a method and apparatus for the production of slotted rod-type optical cables in which the rate of failure in manufacturing the slotted rods is reduced.

These and other objects are provided, according to the present invention, by an improved die and method. The die has an inner surface delimiting an internal bore having a longitudinal axis. Extrusion material enters the bore at a die entrance region and emerges from the bore at a die exit face. The die inner surface comprises a plurality of protrusions extending radially inward toward the bore longitudinal axis and extending from the die entrance region to the die exit face. Such protrusions delimit channels each following a path along the inner surface of the die. The paths may have a shape which is either straight or helical, or begins as straight and ends as helical. Each channel is provided with a separate exit surface adjacent thereto which is machined on the die exit face. Each exit surface is disposed between a pair of protrusions which are adjacent to each other.

None of the exit surfaces lie along a plane which is perpendicular to the longitudinal axis of the bore. Each die exit surface is made to have a nonconstant depth as measured from a plane transverse to the longitudinal axis of the bore. The depth adjustment may be adapted to reduce or eliminate the variability of the lengths of the paths followed by extrusion material within a rib. In a compound depth adjustment, each exit surface may be angled so as to be more nearly transverse to the thread of the channel adjacent thereto and angled so as to have a greater depth with increasing radial distance from the longitudinal axis of the bore. As used herein, the thread of a channel refers to the path followed during extrusion by a point at the center of mass of the extrusion material flowing within the channel.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

As used herein, the term "optical fiber" includes longitudinally extending light waveguides which have single or multiple individual protective coatings. The inner coating is typically formed of a low modulus material and the outer coating is typically formed of a high modulus material. The optical fibers each may include an inked layer to enable the optical fibers to be easily distinguished from each other. It is also generally desirable that the outer coatings of optical fibers or optical fiber ribbons be strippable to facilitate splicing of individual optical fibers.

The optical fiber telecommunication elements may be single optical fibers or optical fiber bundles. Optical fiber bundles may include a plurality of optical fibers embedded in an encapsulating material. A particular form of such a bundle is an optical fiber ribbon, in which a plurality of optical fibers in a planar array are encapsulated in a common coating of plastic material. Such common coatings may be formed of material which is cross-linked by heat or ultraviolet radiation. A plurality of optical fiber ribbons stacked together may be disposed in a single slot of the slotted rod.

Figure 4:
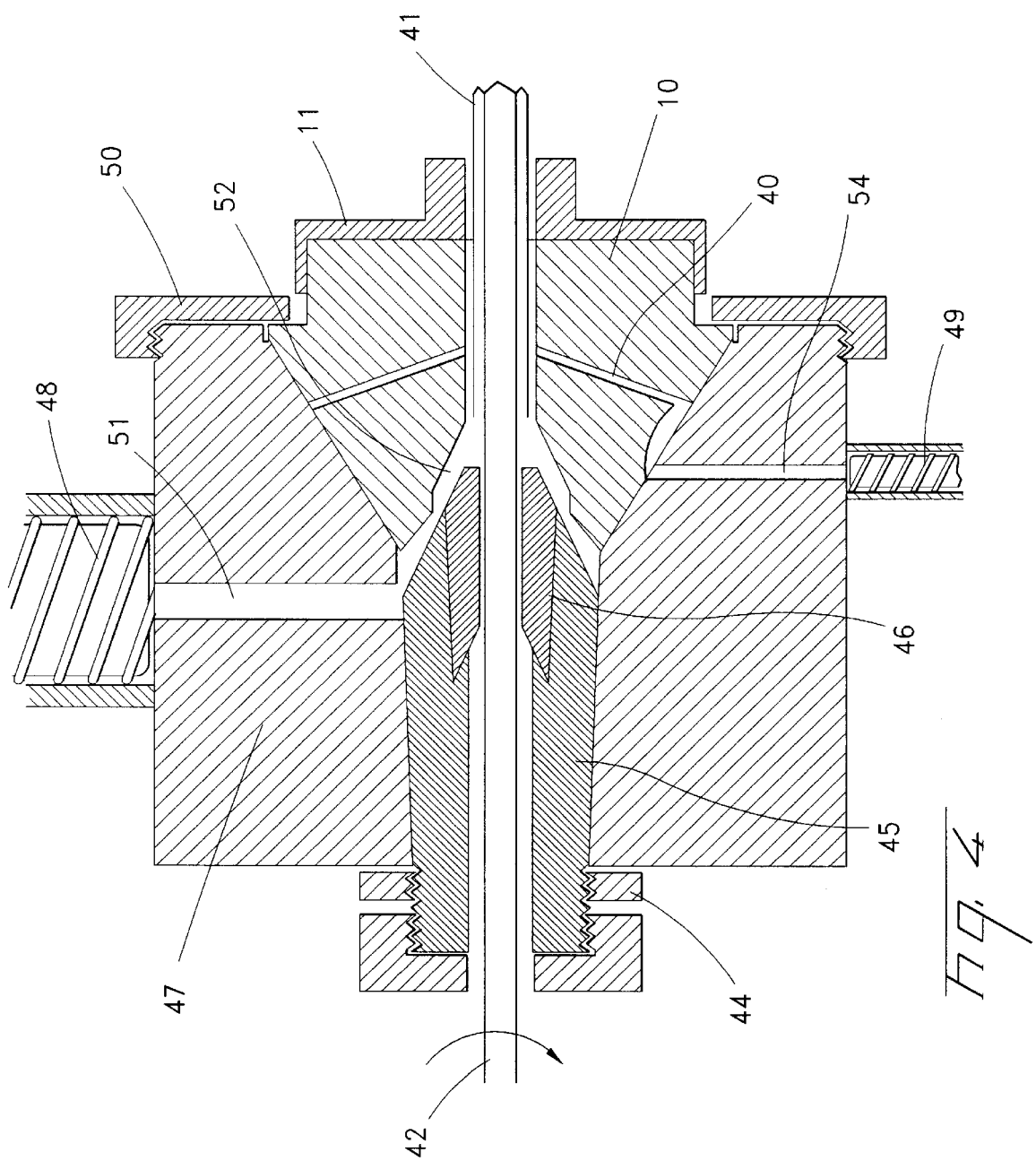
FIG. 4 is a schematic sectional view of an extruder crosshead assembly suitable for implementing the invention; and, FIGS. 5 and 6 are schematic views of the two different angles which may be imparted to a die exit surface.

A fiber optic telecommunication cable slotted rod member to be manufactured is conventional, and typically includes a strength member along its neutral axis. FIG. 4 illustrates a crosshead for extruding the coating formed of plastic material about strength member 42, which is rotated about its neutral axis. A tip assembly 45, 46 is secured to crosshead 47 by retaining ring 44. Guide cap 43 serves to guide strength member 42. Main extruder 48 converts pellets of a plastic material such as polyethylene to a melt extrusion material 41, which proceeds through crosshead passage 51 to passage 52 within the inner surface of die section 10. Extrusion material 41 then proceeds through the die assembly 10, 11 to form a slotted layer about strength member 42. The slotted layer is then cooled downstream of the die apparatus. Die assembly 10, 11 is secured to crosshead 47 by retaining ring 50.

A secondary extruder 49 extrudes a colored material which proceeds through crosshead passage 54 to an exterior channel of die section 10, and thence through at least one die passage 40 to the inner surface of die section 10. The colored material may be used to apply one or more identification indicia such as stripes to one or more peripheral ribs in the slotted rod being formed.

Figure 1:
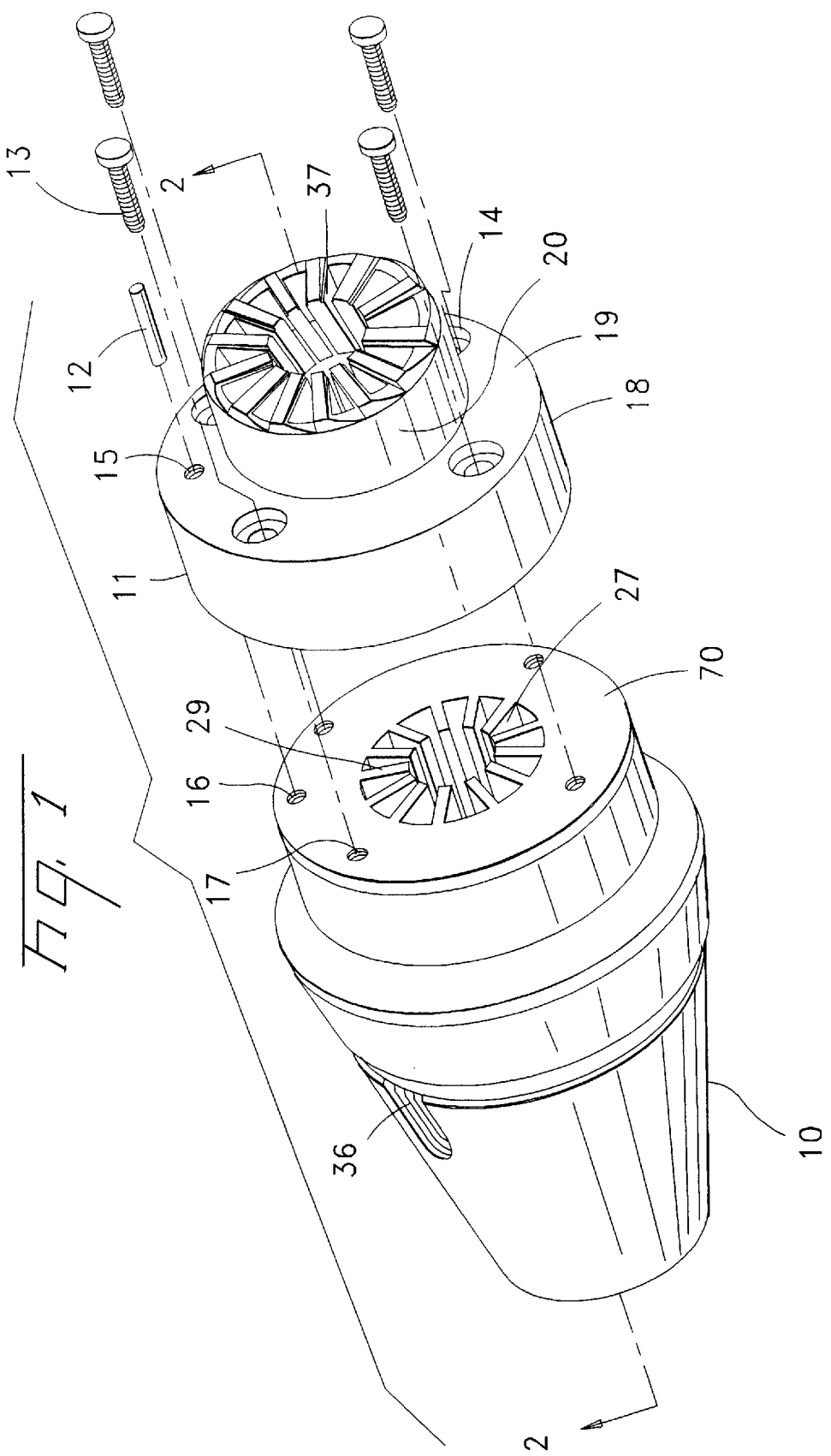
FIG. 1 is a perspective view of a die assembly.
Figure 2:
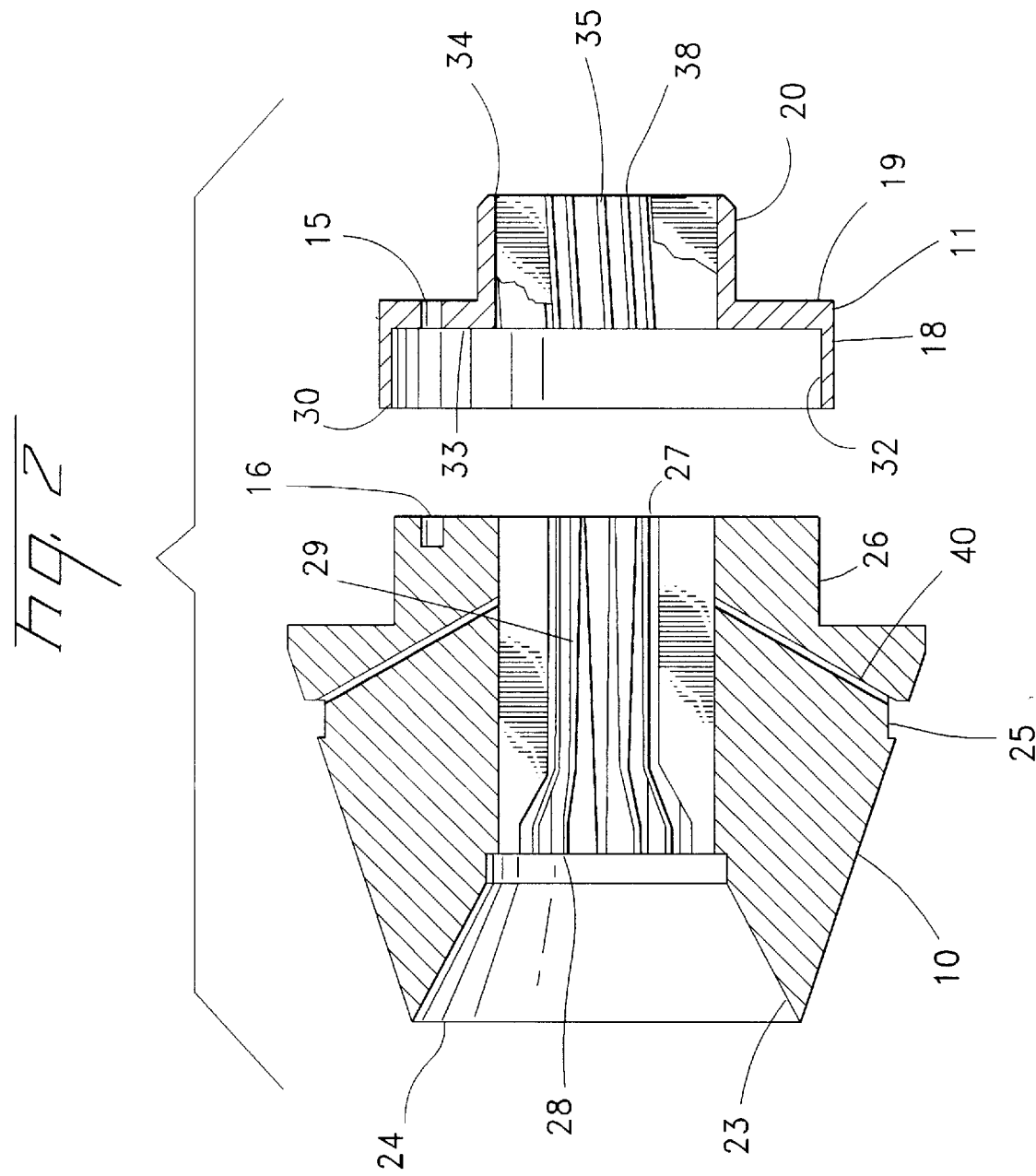
FIG. 2 is a sectional view taken along lines 2—2 of FIG. 1.

Referring now to FIGS. 1 and 2, there is shown the die assembly including a rear section 10 and a front section 11. Both sections of the die assembly are formed from a metallic material suitable for withstanding the heat and pressure conditions present during extrusion. Instead of using two sections, a one-section die may be used having either helical channels or straight channels.

Rear die section 10 has an internal bore 28 and includes a main portion which generally is shaped in the form of a truncated cone. The bores of rear die section 10 and front die section 11 have a common longitudinal axis A (see FIG. 5). Die section 10 also includes a generally cylindrical forward coupling section having an external cylindrical surface 26 which is concentric with its longitudinal axis and an external flat exit face 70 which is transverse to its longitudinal axis. Through exit face 70 and extending generally parallel to its longitudinal axis into the coupling section are an alignment pin hole 16 and several internally threaded screw holes 17. Die section 10 includes on its main portion exterior surface an entrance port 36 and channel 25 for transport of colored material to internal passage 40.

Front die section 11 has a main section 20 and a rearward-facing cylindrical fitting 18. Front die section 11 is mounted to rear die section 10 by means of four mounting screws 13 which seat in holes 14 through surface 19 of die section 11 and internally threaded holes 17 through surface 70 of die section 10. When die sections 10, 11 are mounted to each other, surface 70 of member 10 abuts surface 33 of die section 11, and the front portion of die section 10 surface 26 is contiguous to interior surface 32 of cylindrical fitting 18 of die section 11. Surface 30 of cylindrical fitting 18 does not contact the surface parallel to surface 70 of die section 10. One or more alignment pins 12 may be used; alignment pin 12 as shown in FIG. 1 press fits within hole 15 of section 11 and hole 16 of die section 10.

Strength member 42 is directed through die section 10 entrance 24 and the central opening of bore 28. Strength member 42 then proceeds through the central opening of bore 37 of die section 11 and exits through its exit end 34.

Inwardly extending protrusions 29 of die section 10 are generally parallel to the longitudinal axis of bore 28, and gradually thicken proceeding toward front surface 70. Inwardly extending protrusions 38 of die section 11 have a uniform thickness approximately equal to the thickness of protrusions 29 at surface 70. Inwardly extending protrusions 38 each proceed in a helical path centered on the longitudinal axis A of bore 37, thereby partially delimiting channels 35 which each follow a helical path around the inner surface of die section 11.

Extrusion material 41 is directed through bore 28 of die section 10 and bore 37 of die section 11, and exits through exit face 34 of die section 11. Extrusion material 41 coats the longitudinal external surface of strength member 42 and proceeds through channels 27 formed by radially inward extending protrusions 29 in the inner surface of element 10 and channels 35 formed by radially inward extending protrusions 38 in the inner surface of die section 11, thereby forming peripheral ribs in the exterior surface of the slotted rod member. These ribs delimit the sidewalls of peripheral slots in the exterior surface of the slotted rod member.

Figure 3:
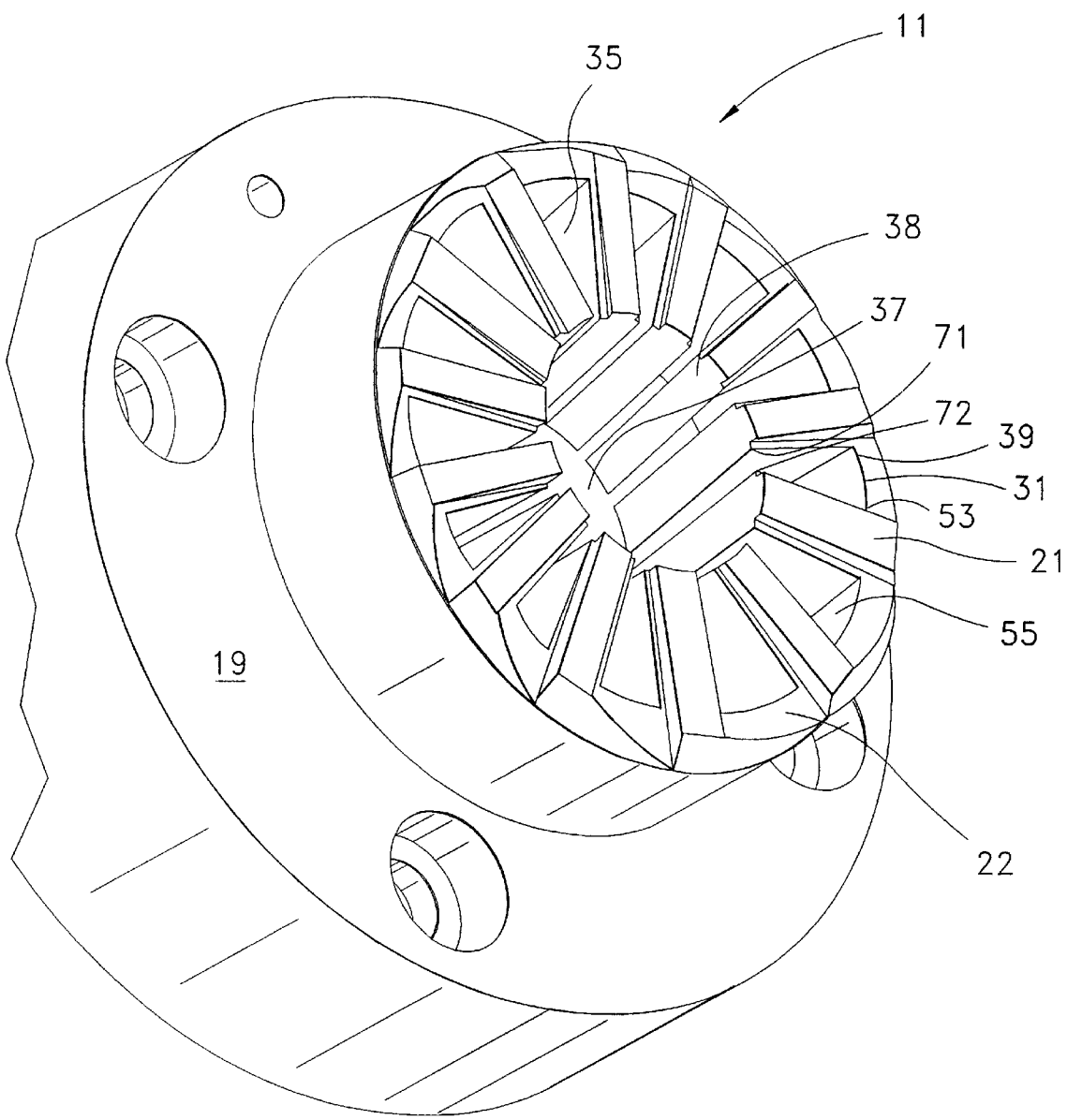
FIG. 3 is a detailed perspective view of the die exit surface.

Exit face 34 of die section 11 comprises a plurality of exit surfaces. With reference to FIG. 3, each exit surface 22 is adjacent to a channel 35 and delimits it on three sides at the end of the channel. Each exit surface 22 has a nonconstant depth as measured from a plane transverse to the longitudinal axis A (see FIGS. 5 and 6) of bore 37. The shape of each exit surface 22 is adapted to reduce or eliminate the variability of the distance traveled within the channel adjacent thereto by said extrusion material and to make each exit surface at least approximately perpendicular to the thread of the adjacent channel.

Each protrusion 38 may be supplied with an extension 21. The forward surfaces of extensions 21 lie generally in a plane which is transverse to the longitudinal axis A of bore 37. Extensions 21 are used to mount to die section 11 a calibration device for maintaining the dimensions of the ribs formed in channels 35 after the ribs emerge from exit face 34. If no such calibration device is to be used, extensions 21 are unnecessary and may be dispensed with.

If exit surfaces 22 were to lie in a plane transverse to bore longitudinal axis A, such as is the case with surfaces 21, extrusion material 41 would tend both to follow a longer helical path within the die with increasing radial distance from axis A and to exhibit a velocity gradient. The resulting variation in drag with radial position within the extrudate 41 exiting die 11 may cause secondary shear effects in the ribs being extruded. No compensation for the variation in drag would then be provided.

To design a die according to the preferred embodiment having exit surfaces 22 having a depth adjustment, one begins by choosing the axial land length of the die helical channels (the longitudinal distance between surfaces 33 and 34); the pitch of the die helical channels; the radial diameter of a radially inward extending protrusion at the radially innermost portion of a helical channel (at point 71 or 72, for example); the radial diameter of a radially inward extending protrusion at the radially outermost portion of a helical channel (at point 53 or 39, for example); the thickness of the radially inward extending protrusions when measured perpendicular to their walls; and, calculated based on the transformation between the helical and transverse frame of reference coordinate systems, the thickness of a radially inward extending protrusion at its radially innermost portion (between points 72 and 92) and its thickness at its radially outermost portion (between points 91 and 53), each of the latter two items measured in the plane perpendicular to the bore longitudinal axis.

For an example, assume the axial land length is 20 mm; the die pitch is 450 mm; the radial diameter of a radially inward extending protrusion at its radially innermost portion is 18 mm; the radial diameter of a radially inward extending protrusion at its radially outermost portion is 32 mm; the thickness of a radially inward extending protrusion when measured perpendicularly to its walls is 2.65 mm; and the thickness of such a protrusion at its radially innermost portion is 2.6708 mm and its thickness at its radially outermost portion is 2.7154 mm, both as measured in a plane perpendicular to the bore longitudinal axis.

To calculate a simple solution for the depth adjustment for an exit surface to help compensate for the radial variation in drag on the extrudate, the helical path lengths at various radii within a die channel may be approximately equalized as follows.

The arc length, $\zeta$, for a helix whose endpoints are separated by a pitch p, is $$\zeta = 2\pi\phi[R^2 + (p/2\pi)^2] \qquad (1)$$

where R is the radius of the helix.

The arc length $\zeta$ over a path which does not follow a complete $2\pi$ circular path is $$\zeta = 2\pi\phi[(R\lambda/p)^2 + (\lambda/2\pi)^2] \qquad (2)$$

where $\lambda$ is the axial length travelled.

An angle $\theta$, the helix angle, may be defined: $\theta = \tan^{-1}(2\pi R/p)$. Using this definition, $$\zeta = \lambda\sec\theta. \qquad (3)$$

Using the definition of $\theta$, one first calculates helix angles of the system at the two radii in question. Using data from the above example, $$\theta_{inner} = \tan^{-1}(2\pi(9 \text{ mm})/450 \text{ mm}) = 0.125 \text{ radians, and}$$

$$\theta_{outer} = \tan^{-1}(2\pi(16 \text{ mm})/450 \text{ mm}) = 0.219 \text{ radians.}$$

Figure 5:
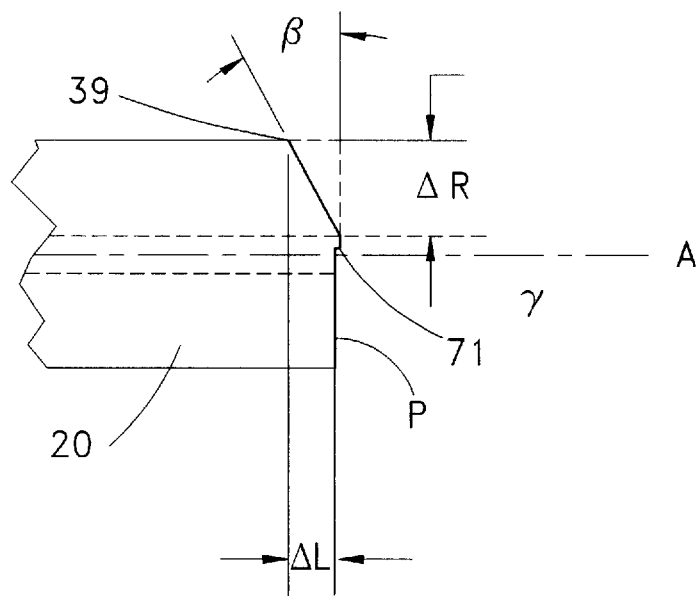
Figure 6:
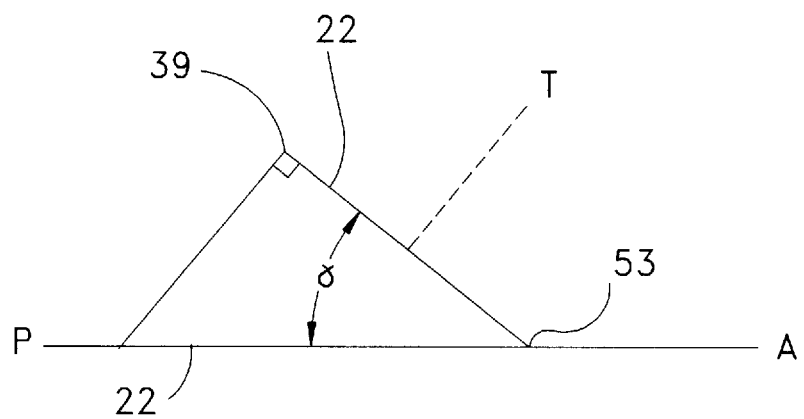

Using equation (3), $\zeta_{inner} = 20$ mm sec $(0.125) = 20.157$ mm, and $\zeta_{outer} = 20$ mm sec $(0.219) = 20.493$ mm. With reference to FIG. 5, $\Delta\zeta = \zeta_{outer} - \zeta_{inner} = 0.336$ mm.

The depth of cutback of an exit surface along its radially outermost diameter is therefore 0.336 mm in the simple case as measured from plane P, which is transverse to bore longitudinal axis A.

The angle $\beta$ of cutback is the inverse tangent of $(\Delta\zeta/\Delta R)$, where $\Delta R$ is the difference between the inner radius and outer radius of a channel. $\Delta R = R_{outer} - R_{inner} = (32/2 - 18/2) = 16 - 9 = 7$ mm. So $\beta = \tan^{-1}(0.336 \text{ mm}/7 \text{ mm}) = 2.748° = 0.048$ rad. Depth adjustment $\Delta\zeta$ increases with increasing distance from bore longitudinal axis A.

The second depth adjustment, which also helps to equalize drag by making each exit surface 22 more nearly transverse to the thread T of the adjacent helical channel rather than transverse to the longitudinal axis of bore 37, may be calculated as follows. See FIG. 6. In the simplest case, the depth adjustment results in a planar exit surface 22 which increases in depth from point 53 to point 39 with respect to a plane P transverse to the longitudinal axis of bore 37. The angle $\gamma$ of cutback may be calculated as follows.

$$\gamma_1 = \cos^{-1}(2.65/2.7154) = 12.600° \text{ at the outer radius.}$$

$$\gamma_2 = \cos^{-1}(2.65/2.6708) = 7.155° \text{ at the inner radius.}$$

The angle $\gamma$ may be selected to be the arithmetic mean of $\gamma_1$ and $\gamma_2$, or $9.875° = 0.172$ rad.

The individual channel exits of die section 11 can be defined by a depth adjustment involving either angle $\gamma$ or angle $\beta$ or by a compound depth adjustment involving both angles $\gamma$ and $\beta$. Experience has indicated that using only an approximation of angle $\gamma$ as defined by the average of $\gamma_1$ and $\gamma_2$ will result in a commercially usable die. However, it is preferred to calculate $\gamma$ at discrete points all along the channel exit surface and combine these points into a curve. One may then combine adjustments of $\gamma$ and $\beta$ together into a compound curved surface (depth adjustment) to make the most geometrically correct die exit surface.

One method of forming the straight channels 27 in die section 10 is to utilize a wire electrode which cuts a selected portion of metal. The central slug portion can then be removed to form the bore of die section 10.

One method of forming the helical channels 35 in die section 11 is to utilize an extended ram-type electrode having peripheral ribs each following a helical path. The extended electrode is then turned as it is moved through the metal object to produce channels 35, with the rate of turning dependent upon the desired pitch of channels 35. The exit end 34 of die section 11 is formed using another ram-type electrode having a contoured relief surface opposite to that of the surface desired for exit end 34.

In an alternative embodiment, one may retain the shapes of exit surfaces 22 while making each of the channels 35 of die section 11 so as to follow a straight path rather than a helical path. If one desires that channels 35 be straight, a wire electrode may be used to form them. Channels 35 should then each be straight, but angled at an angle θ, such as the average of $θ_{inner}$ and $θ_{outer}$ hereinabove derived, with respect to the bore longitudinal axis A. As the angle is greater than zero, the straight channels will be nonparallel to bore longitudinal axis A. Due to the scale used, FIGS. 1–6 generally depict the alternative embodiment as well as the preferred embodiment.

Although it is preferred that channels 35 each follow a helical path, die section 11 may be made at lower cost if channels 35 are straight. Although straight channels should each be disposed at an angle equal in magnitude to angle θ, the straight channels could be made parallel to the bore longitudinal axis if further cost economies were necessary.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A die for manufacturing an optical fiber telecommunication cable member having a plurality of peripheral ribs each following a generally helical path and at least partially delimiting peripheral slots, at least one of said slots adapted to carry at least one optical fiber therein;

said die comprising an inner surface, said inner surface delimiting a bore adapted to receive extrusion material, and said die includes an exit face through which such extrusion material is to emerge, said bore having a longitudinal axis and including a plurality of channels, each of said channels follows a helical path and includes respective walls extending away from a center of said die;

said exit face comprises a plurality of exit surfaces, at least one said exit surface being adjacent to one of said channels and defining edges where said walls of said one channel meet said exit face, said edges being generally radially straight at respective medial portions thereof, and said exit surface having a nonconstant depth as measured from a plane transverse to said bore longitudinal axis.

2. A die as set out in claim 1, wherein said exit surface has a shape which is adapted to reduce or eliminate the variability of the distance traveled within the channel adjacent thereto by said extrusion material.

3. A die as set out in claim 1, wherein the depth of said exit surface as measured from a plane transverse to the longitudinal axis of said bore increases with increasing distance of said surface from said bore longitudinal axis.

4. A die as set out in claim 1, wherein said channel adjacent to said exit surface has a thread, and said exit surface is generally transverse to said thread.

5. A die as set out in claim 1, further comprising a plurality of die extensions each having a surface disposed substantially along a plane which is transverse to said bore longitudinal axis.

6. A die for manufacturing an optical fiber telecommunication cable member having a plurality of peripheral ribs each following a generally helical path and at least partially delimiting peripheral slots, at least one of said slots adapted to carry at least one optical fiber therein;

said die comprising an inner surface delimiting a bore adapted to receive extrusion material and an exit face through which such extrusion material is to emerge, said bore having a longitudinal axis and including a plurality of channels, said channels each follow a straight path and each said straight path is non-parallel to said bore longitudinal axis;

said die exit face comprises a plurality of exit surfaces, at least one said exit surface being adjacent to a said channel and having a nonconstant depth as measured from a plane transverse to said bore longitudinal axis.

7. A die assembly for expressing a slotted core member of a fiber optic cable, said die assembly comprising:

(a) a first die section, said first die section includes a plurality of channels between ribs, said channels being operative to guide molten material in said die assembly, said first die section comprises a mounting portion for receiving a second die section;

(b) a second die section, said second die section being mountable on said mounting portion and comprise a bore with a longitudinal axis, said second die section comprises channels between ribs, said channels being operative to guide molten material in said die assembly;

(c) said second die section comprises an exit face, said second die channels communicating with said exit face, at least one of said second die section channels includes walls extending away from a center of said die, edges are defined where walls of said one second die section channel meet said exit face, said edges being generally radially straight at respective medial portions thereof for forming generally flat walls on said slotted core member, said at least one channel further including an exit surface, said exit surface having a nonconstant depth as measured from a plane transverse to said longitudinal axis.

8. The die assembly of claim 7, a width of said first die section channels gradually becoming narrower.

9. The die assembly of claim 7, wherein said die assembly is a stationary die.

10. The die assembly of claim 7, wherein one of said mounting portion and said second die section comprises a mounting section which fits into the other of said mounting portion and said second die section.

11. The die assembly of claim 7, wherein said second die section channels follow a straight path non-parallel to said bore longitudinal axis.

12. The die assembly of claim 11, wherein said second die section channels extend at an acute angle relative to said first die section channels.

13. A die section for expressing a slotted core member of a fiber optic cable, said die section comprising:

(a) a channel for guiding molten material along a bore longitudinal axis of said die section, said channel includes generally radially extending walls and an outer wall therebetween for forming part of said slotted core member;

(b) an exit face, said channel being in communication with said exit face and defining an exit contour generally about said channel;

(c) said exit contour comprising first and second surfaces associated with said generally radially extending walls of said channel, said first and second surfaces extend generally radially away from a center of said die section, and said exit contour comprises an outer surface associated with said outer wall of said channel;

(d) at least one of said first and second surfaces comprises a nonconstant depth adjustment with respect to a plane transverse to said bore longitudinal axis;

(e) whereby, when molten material is flowing through said die section a portion of said molten material flows through said channel and is expressed through said exit contour, said at least one of said first and second surfaces affecting a velocity gradient of said molten material thereby tending to equalize drag of said molten material in said channel.

14. The die section of claim 13, wherein said outer surface of said exit contour comprises an arcuate edge.

15. The die section of claim 13, wherein each of said first and second surfaces is inclined.

16. The die section of claim 15, wherein said first and second surfaces are inclined in opposing directions.

17. The die section of claim 13, wherein one of said first and second surfaces comprises a compound depth adjustment along an arcuate profile.

18. The die section of claim 13, wherein said outer surface and said first and second surfaces of said exit contour each comprise a respective depth adjustment relative to said transverse plane along an arcuate shape.

19. The die section of claim 13, wherein respective radially innermost portions of said first and second surfaces are disposed at different depths with respect to said transverse plane.

* * * * *